United States Patent
Arakawa

(10) Patent No.: US 9,396,055 B2
(45) Date of Patent: Jul. 19, 2016

(54) ELECTRONIC DEVICE AND LOG RECORDING METHOD

(71) Applicant: KYOCERA Document Solutions Inc., Osaka-shi, Osaka (JP)

(72) Inventor: Kazuhisa Arakawa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 107 days.

(21) Appl. No.: 14/260,203

(22) Filed: Apr. 23, 2014

(65) Prior Publication Data

US 2014/0325293 A1    Oct. 30, 2014

(30) Foreign Application Priority Data

Apr. 24, 2013 (JP) ................................. 2013-091146

(51) Int. Cl.
*G06F 11/00*     (2006.01)
*G06F 11/07*     (2006.01)

(52) U.S. Cl.
CPC ........ *G06F 11/0787* (2013.01); *G06F 11/0733* (2013.01); *G06F 11/0766* (2013.01)

(58) Field of Classification Search
CPC ............ G06F 11/0766; G06F 11/0733; G06F 11/0787; G06F 11/0793; G06F 11/0709; G06F 11/0772; G06F 11/0781
See application file for complete search history.

(56) References Cited

U.S. PATENT DOCUMENTS

| 8,112,579 | B2 * | 2/2012 | Imai | .................... | G06F 11/1456 711/111 |
| 2004/0103395 | A1 | 5/2004 | Sasaki et al. | | |
| 2004/0141201 | A1 * | 7/2004 | Shima | ................... | H04L 43/067 358/1.15 |
| 2010/0225945 | A1 * | 9/2010 | Hatano | .............. | H04N 1/00326 358/1.13 |
| 2014/0122421 | A1 * | 5/2014 | Furukoshi | ........... | G06F 11/0757 707/609 |

FOREIGN PATENT DOCUMENTS

| JP | 03107724 A | 5/1991 |
| JP | 07330239 A | 12/1995 |
| JP | 08147194 A | 6/1996 |
| JP | 2004178118 A | 6/2004 |
| JP | 2010223560 A | 10/2010 |

* cited by examiner

*Primary Examiner* — Bryce Bonzo
*Assistant Examiner* — Katherine Lin
(74) *Attorney, Agent, or Firm* — Alleman Hall McCoy Russell & Tuttle LLP

(57) ABSTRACT

An electronic device includes a plurality of buffers and a log recording portion. In the plurality of buffers, a plurality of kinds of logs are to be recorded. The log recording portion records each log in a buffer, among the plurality of buffers, that is assigned in accordance with a recording interval of the log.

7 Claims, 6 Drawing Sheets

ELECTRONIC DEVICE AND LOG RECORDING METHOD

INCORPORATION BY REFERENCE

This application is based upon and claims the benefit of priority from the corresponding Japanese Patent Application No. 2013-091146 filed on Apr. 24, 2013, the entire contents of which are incorporated herein by reference.

BACKGROUND

The present disclosure relates to an electronic device which records logs and relates to a log recording method.

In general, in an electronic device such as a printer, a copy machine, or a multifunction peripheral, logs that indicate history of operation are recorded in a storage portion such as a RAM, in order to be used in clarifying causes of abnormalities. At this time, each log is recorded by the oldest log being overwritten within a buffer that is secured in advance in the storage portion and that has a predetermined size.

Meanwhile, there are cases where a plurality of kinds of logs to be recorded in normal time in an electronic device have different recording intervals depending on the content or importance of the logs, respectively. However, conventionally, the plurality of kinds of logs are recorded by the oldest log being sequentially overwritten within the same buffer, irrespective of their recording intervals. As a result, in the buffer, the accumulated amount of a log having a shorter recording interval becomes large and the accumulated amount of a log having a longer recording interval becomes small. On the other hand, as a method for recording logs, there has been known a technology which shortens a recording interval by limiting logs to be recorded at the time of occurrence of an abnormality, thereby recording necessary logs while reducing the amount of memory to be used of the buffer.

SUMMARY

An electronic device according to the present disclosure includes a plurality of buffers and a log recording portion. In the plurality of buffers, a plurality of kinds of logs are to be recorded. The log recording portion records each log in a buffer, among the plurality of buffers, that is assigned in accordance with a recording interval of the log.

A log recording method according to the present disclosure includes: a step of preparing a plurality of buffers in which a plurality of kinds of logs are to be recorded; and a step of recording each log in a buffer, among the plurality of buffers, that is assigned in accordance with a recording interval of the log.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings in order to allow understanding of the present disclosure. It should be noted that the following embodiment is an example embodying the present disclosure, and, by nature, does not limit the technical scope of the present disclosure.

[Schematic Configuration of Multifunction Peripheral 10]

First, with reference to FIG. 1, the schematic configuration of the multifunction peripheral 10 according to an embodiment of the present disclosure will be described.

Figure 1:
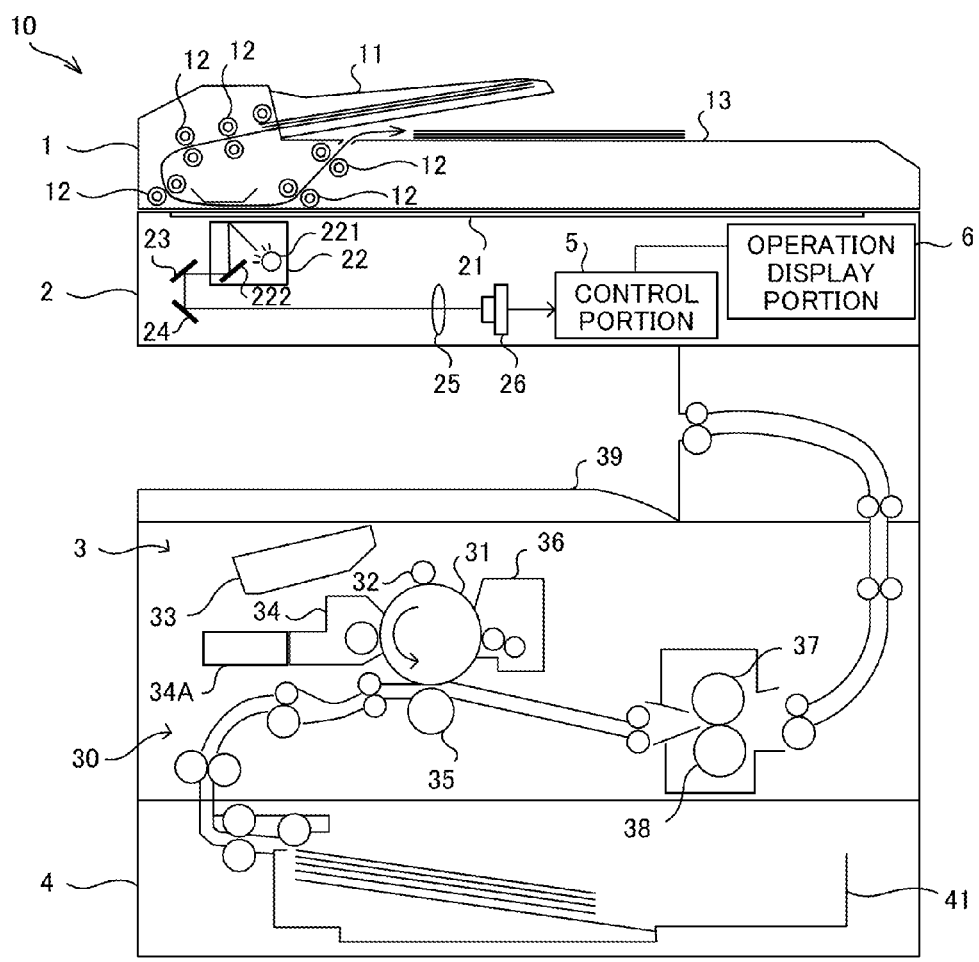
FIG. 1 is a schematic diagram showing a schematic configuration of a multifunction peripheral according to an embodiment of the present disclosure.

As shown in FIG. 1, the multifunction peripheral 10 includes an ADF 1, an image reading portion 2, an image forming portion 3, an sheet feed portion 4, a control portion 5, an operation display portion 6, and the like. It should be noted that the multifunction peripheral 10 is merely an example of an electronic device according to the present disclosure, and a printer, a copy machine, a facsimile apparatus, a smartphone, a tablet terminal, a personal computer, or the like also corresponds to an electronic device according to the present disclosure.

The operation display portion 6 is provided on an outer surface of the multifunction peripheral 10. The operation display portion 6 includes a display portion, such as a liquid crystal display, which displays various kinds of information in accordance with a control instruction from the control portion 5. Moreover, the operation display portion 6 includes an operation portion such as a hardware key or a touch panel that allows an input of various kinds of information to the control portion 5 in accordance with a user operation.

The ADF 1 is an automatic document sheet conveying device which causes each of conveying rollers 12 to be driven by a motor not shown, thereby causing a document sheet set on a document sheet placing portion 11 to pass through a position where an image is read by the image reading portion 2, thereby conveying the document sheet to a discharge tray 13.

The image reading portion 2 is an image reading portion including a document sheet table 21, a light source unit 22, mirrors 23 and 24, an optical lens 25, a CCD (Charge Coupled Device) 26, and the like. The document sheet table 21 is a document sheet placing portion provided on the upper surface of the image reading portion 2. The light source unit 22 includes an LED light source 221 and a mirror 222, and is movable in a secondary scanning direction (left-right direction in FIG. 1) by a motor not shown. The LED light source 221 includes multiple white LEDs arranged along a primary scanning direction (depth direction in FIG. 1). The mirror 222 reflects light that has been emitted from the LED light source 221 and reflected at the surface of the document sheet at a reading position on the document sheet table 21, toward the mirror 23. Then, the light reflected by the mirror 222 is guided to the optical lens 25 by the mirrors 23 and 24. The optical lens 25 condenses light incident thereon and causes the condensed light to be incident on the CCD 26. The CCD 26 includes a photoelectric conversion element which inputs, to the control portion 5, an electrical signal corresponding to the light amount of the light received from the optical lens 25, as image data of the document sheet.

The image forming portion 3 is an image forming portion of an electronic photograph type which executes an image forming process (printing process) based on the image data read by the image reading portion 2 or image data inputted from an electronic device such as an external personal computer or the like. Specifically, the image forming portion 3 includes a conveying portion 30, a photosensitive drum 31, a charging device 32, an exposure device (LSU) 33, a developing device 34, a transfer roller 35, a cleaning device 36, a fixing roller 37, a pressurizing roller 38, a discharge tray 39, and the like.

On the other hand, the sheet feed portion 4 supplies, to the image forming portion 3, a sheet such as paper contained in a sheet feed cassette 41 removable from the multifunction peripheral 10. The sheet supplied to the image forming portion 3 is caused by the conveying portion 30 to pass through the photosensitive drum 31 and the transfer roller 35, and then the fixing roller 37 and the pressurizing roller 38, to be discharged to the discharge tray 39. At this time, in the image forming portion 3, an image forming process of forming an image on the sheet that has been supplied from the sheet feed portion 4 and conveyed by the conveying portion 30 is performed in the following procedure.

First, the photosensitive drum 31 is uniformly charged at a predetermined potential by the charging device 32. Next, light based on the image data is applied to the surface of the photosensitive drum 31 by the exposure device 33. Thus, an electrostatic latent image corresponding to the image data is formed on the surface of the photosensitive drum 31. The electrostatic latent image on the photosensitive drum 31 is developed (visualized) with toner by the developing device 34. The developing device 34 is supplied with toner from a toner container 34A removable from the image forming portion 3. Subsequently, a toner image having formed on the photosensitive drum 31 is transferred to the sheet by the transfer roller 35. Thereafter, the toner image having been transferred to the sheet is heated and fused by the fixing roller 37, to be fixed onto the sheet while the sheet passes between the fixing roller 37 and the pressurizing roller 38. The toner remaining on the surface of the photosensitive drum 31 after the image forming process has been performed by the image forming portion 3 is removed by the cleaning device 36.

Figure 2:
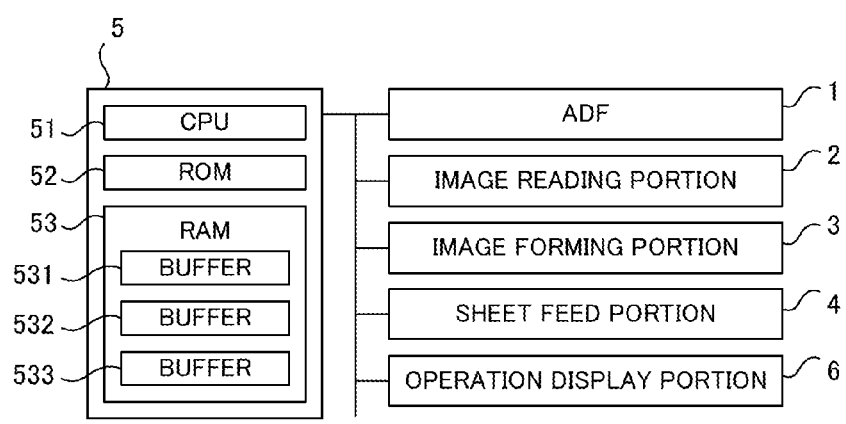
FIG. 2 is a block diagram showing a system configuration of the multifunction peripheral according to the embodiment of the present disclosure.

Next, with reference to FIG. 2, the system configuration of the multifunction peripheral 10 will be described.

The control portion 5 is a computer that includes control instruments such as a CPU 51, a ROM 52, and a RAM 53. The CPU 51 is a processor that executes various kinds of calculation processes. The ROM 52 is a nonvolatile storage portion in which information such as control programs for causing the CPU 51 to execute various kinds of processes is stored in advance. The RAM 53 is a volatile storage portion in which various kinds of information is stored, and is used as a temporary storage memory (working area) for various kinds of processes to be executed by the CPU 51. The CPU 51 performs overall control of the multifunction peripheral 10 by executing various kinds of control programs stored in advance in the ROM 52. The control portion 5 may be structured as an electronic circuit such as an integrated circuit (ASIC, DSP), or may be an engine control portion provided in the image forming portion 3 or the like, separately from a main control portion that performs overall control of the multifunction peripheral 10.

Specifically, in accordance with the control programs stored in the ROM 52, the CPU 51 executes a log recording process (see FIG. 4) described later for recording, in the RAM 53, logs indicating history of operation of the multifunction peripheral 10. The logs are information that is recorded in order to be used in clarifying causes of abnormalities, and include various kinds of information such as, for example, detection results from a paper sheet detection sensor, and a temperature sensor, and the like provided in the multifunction peripheral 10, processing contents performed by the CPU 51, and status information of the multifunction peripheral 10.

Even in a case where logs to be recorded at the time of occurrence of an abnormality are limited, if a plurality of kinds of logs are stored in one buffer, there still remains the problem that logs with a long recording interval are overwritten and the accumulated amount thereof is reduced. In contrast to this, in the multifunction peripheral 10, accumulation amounts of respective logs having different recording intervals are individually secured.

Here, the RAM 53 is provided with a plurality of buffers 531 to 533 in which various kinds of logs are to be recorded in the log recording process. The buffers 531 to 533 are fixed storage areas set in advance. Alternatively, the buffers 531 to 533 may be secured in the RAM 53 by the CPU 51, at the time of starting the multifunction peripheral 10, or the like. In the present embodiment, an exemplary case where the buffers 531 to 533 are recording areas secured in the RAM 53 will be described. However, the buffers 531 to 533 may respectively be provided in storage portions such as different RAMs.

The buffers 531 to 533 have different storage capacities in accordance with contents of logs to be recorded. Specifically, the storage capacity of the buffer 531 is largest, and the storage capacity of the buffer 532 is smaller than that of the buffer 531 and larger than that of the buffer 533. In the multifunction peripheral 10, based on log correspondence information D1 stored in advance in the ROM 52, the CPU 51 records each log into a buffer, among the plurality of the buffers 531 to 533, that is assigned in accordance with the recording interval of the log.

The log correspondence information D1 is information indicating the correspondence between: a first group, a second group, and a third group defined as groups of logs to be recorded in the buffers 531, 532, and 533; and the kinds of logs belonging to the groups. The first group is a group for logs having the shortest recording interval, the second group is a group for logs having the second shortest recording interval, and the third group is a group for logs having the longest recording interval. That is, among the plurality of the buffers 531 to 533, the buffer 531 being a recording destination of the logs having the shortest recording interval has a storage capacity larger than storage capacities of the buffer 532 and the buffer 533 being recording destinations of the logs having longer recording intervals. The buffer 532 has a storage capacity larger than that of the buffer 533.

Figure 3:
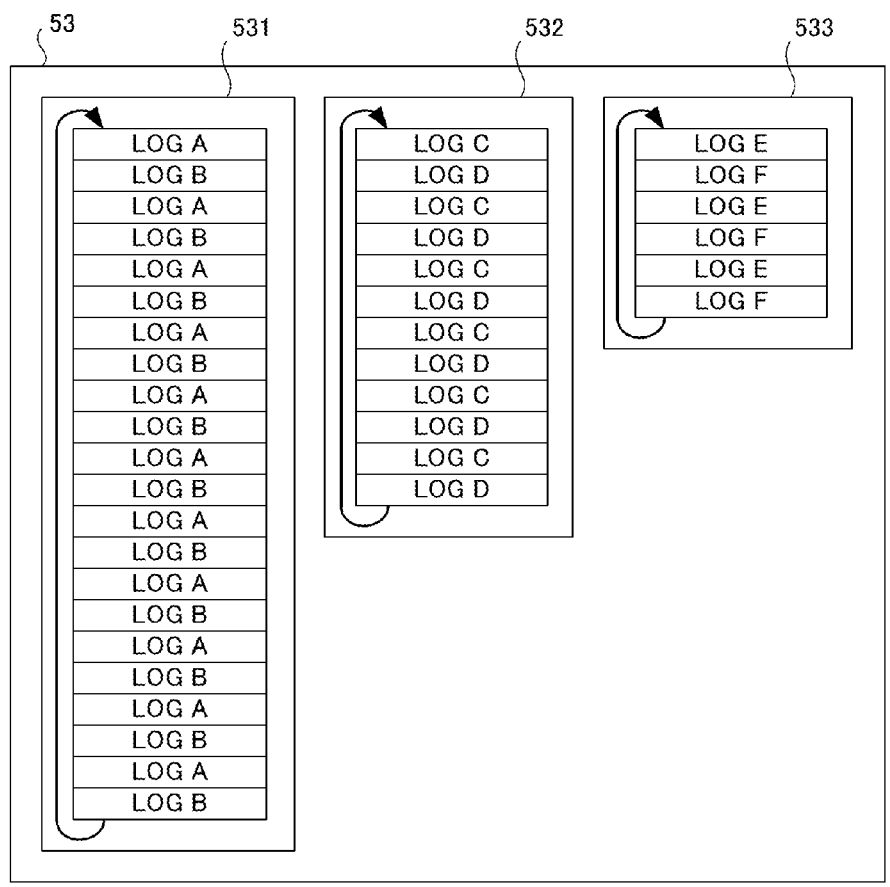
FIG. 3A and FIG. 3B are diagrams for explaining one example of log correspondence information to be used in the multifunction peripheral according to the embodiment of the present disclosure.

FIG. 3A shows an example of the log correspondence information D1 stored in the ROM 52. As shown in FIG. 3A, in the log correspondence information D1, the first group is associated with a log A and a log B. Similarly, the second group is associated with a log C and a log D, and the third group is associated with a log E and a log F. The log A and the log B are logs whose recording intervals are shorter than those of the log C, the log D, the log E, and the log F. The log C and the log B are logs whose recording intervals are shorter than those of the log E and the log F. It should be noted that the number of buffers secured in the RAM 53 and the number of groups of the logs are not limited to three, and may be two or more.

The log A is, for example, a debug log regarding the presence/absence of occurrence of an error in the multifunction peripheral 10, and its recording interval is 0.1 second. The log B is, for example, a paper sheet conveyance control log regarding operation of a drive system which conveys sheets in the multifunction peripheral 10, and its recording interval is 0.2 second. The log C is, for example, a toner control log regarding operation of toner supply from the toner container 34A to the developing device 34, and its recording interval is 0.25 second. The log D is, for example, a development control log regarding operation of the developing device 34, and its recording interval is 0.3 second. The log E is, for example, an emergency log system log regarding the presence/absence of occurrence of an emergency such as runaway of a system including the control portion 5, and its recording interval is 0.4 second. The log F is, for example, a system log regarding the operation state of the system including the control portion 5 and the like, and its recording interval is 0.5 second.

The CPU 51 reads the log correspondence information D1 from the ROM 52 to expand it on the RAM 53, and executes a log recording process of allocating each log to a corresponding one of the plurality of the buffers 531 to 533 based on the log correspondence information D1, and recording the log therein. The CPU 51 when executing the log recording process is an example of a log recording portion.

[Log Recording Process]

Figure 4:
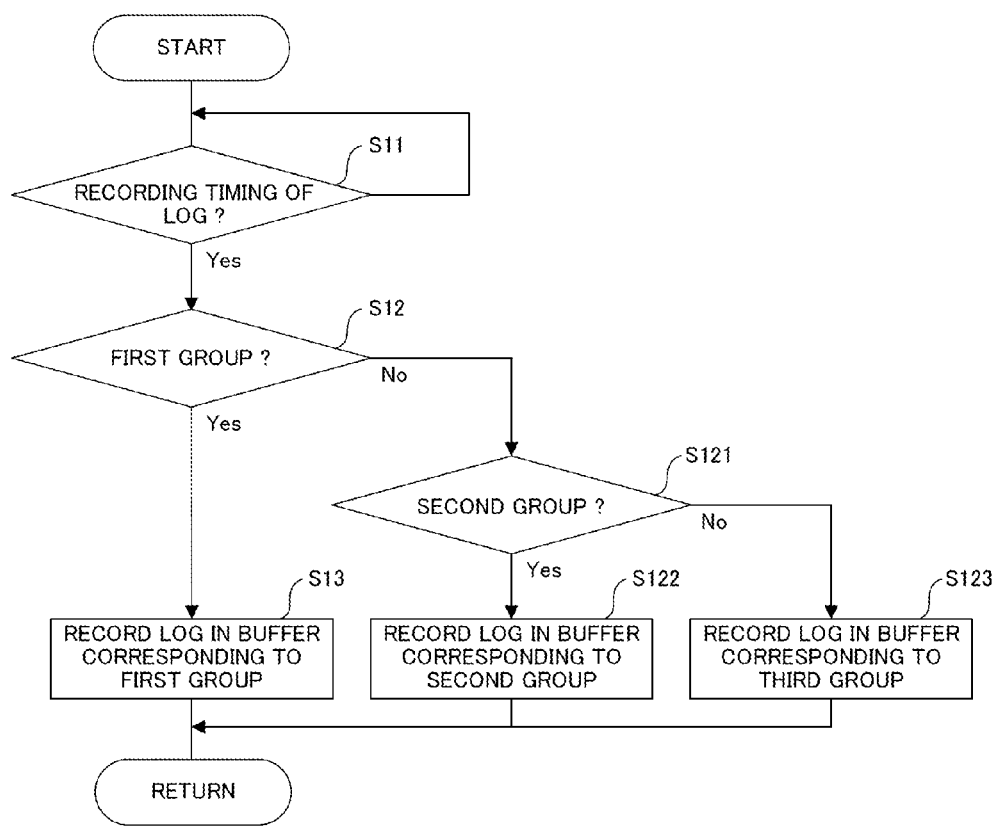
FIG. 4 is a flow chart for explaining one example of the procedure of a log recording process to be executed by the multifunction peripheral according to the embodiment of the present disclosure.

With reference to FIG. 4, one example of the procedure of the log recording process executed by the CPU 51 in the multifunction peripheral 10 will be described. S11, S12, and the like shown in FIG. 4 represent process procedure (step) numbers.

<Step S11>

First, in step S11, the CPU 51 waits for a recording timing of any of the various kinds of logs in the multifunction peripheral 10 (No in S11). Specifically, the CPU 51 determines whether the recording timing of each of the logs has arrived based on the recording intervals set in advance for the respective logs. Upon determining that the recording timing of any of the logs has arrived (Yes in S11), the CPU 51 shifts the process to step S12.

<Step S12>

Next, in step S12, based on the log correspondence information D1, the CPU 51 determines whether the log whose recording timing has been determined as having arrived in the step S11 belongs to the first group. Upon determining that the log belongs to the first group (Yes in S12), the CPU 51 shifts the process to step S13, and upon determining that the log does not belong to the first group (No in S12), the CPU 51 shifts the process to step S121.

<Step S13>

In step S13, the CPU 51 records the log whose recording timing has been determined as having arrived in the step S11, in the buffer 531 corresponding to the first group. For example, in accordance with the arrival of the recording timing of the log A or the log B, the CPU 51 stores the log A or the log B in the buffer 531 as shown in FIG. 3B. At this time, the CPU 51 records the log by overwriting the oldest information in the buffer 531.

<Step S121>

In step S121, based on the log correspondence information D1, the CPU 51 determines whether the log whose recording timing has been determined as having arrived in the step S11 belongs to the second group. Upon determining that the log belongs to the second group (Yes in S121), the CPU 51 shifts the process to step S122, and upon determining that the log does not belong to the second group (No in S121), the CPU 51 shifts the process to step S123.

<Step S122>

In step S122, the CPU 51 records the log whose recording timing has been determined as having arrived in the step S11, in the buffer 532 corresponding to the second group. For example, in accordance with the arrival of the recording timing of the log C or the log D, the CPU 51 stores the log C or the log D in the buffer 532 as shown in FIG. 3B. At this time, the CPU 51 records the log by overwriting the oldest information in the buffer 532.

<Step S123>

On the other hand, in step S123, the CPU 51 records the log whose recording timing has been determined as having arrived in the step S11, in the buffer 533 corresponding to the third group. For example, in accordance with the arrival of the recording timing of the log E or the log F, the CPU 51 stores the log E or the log F in the buffer 533 as shown in FIG. 3B. At this time, the CPU 51 records the log by overwriting the oldest information in the buffer 533.

As described above, in the multifunction peripheral 10, by the log recording process being executed by the CPU 51, each log is recorded in a buffer, among the plurality of the buffers 531 to 533, that is assigned in accordance with the recording interval of the log. Specifically, a log belonging to the first group corresponding to the shortest recording cycle is recorded in the buffer 531. Similarly, a log belonging to the second group corresponding to the second shortest recording cycle is recorded in the buffer 532, and a log belonging to the third group corresponding to the longest recording cycle is recorded in the buffer 533. Therefore, in the multifunction peripheral 10, a plurality of types of logs are recorded in different buffers in accordance with their respective recording intervals, and thus, the accumulation amounts of the respective logs having different recording intervals can be individually secured. Accordingly, it is possible to prevent only the accumulation amount of the log having a long recording interval from becoming extremely small.

It is also conceivable that, when the CPU 51 causes a display device such as the operation display portion 6 or an external personal computer to display the logs recorded in the buffers 531 to 533 of the RAM 53, the CPU 51 causes the display device to output display screens that are respectively different for the buffers 531 to 533. Accordingly, the display amounts of the respective logs having different recording intervals are individually secured on the respective display screens of the operation display portion 6 or the display device. Similarly, it is also conceivable that, when the CPU 51 outputs the logs recorded in the buffers 531 to 533 of the RAM 53 to a storage device (not shown) such as a hard disk provided in the multifunction peripheral 10 or a storage device of an external personal computer or the like, the CPU 51 outputs the logs to storage devices that are respectively different for the buffers 531 to 533. Accordingly, the storage amounts of the respective logs having different recording intervals are individually secured in the respective storage devices.

For the multifunction peripheral 10, a configuration is conceivable in which, when a specific event such as an abnormality set in advance has occurred, a detailed log is recorded by shortening the recording interval of a log whose recording interval is long at normal time. In this case, in the configuration where the recording destination of each log is controlled based on the log correspondence information D1, by shortening the recording interval of, for example, the log C, the accumulation amount of the log D is extremely reduced. Therefore, in the multifunction peripheral 10, by a recording destination changing process described later being executed by the CPU 51, in a case where the specific event has occurred, the storage destinations of logs are changed as appropriate.

[Recording Destination Changing Process]

Figure 5:
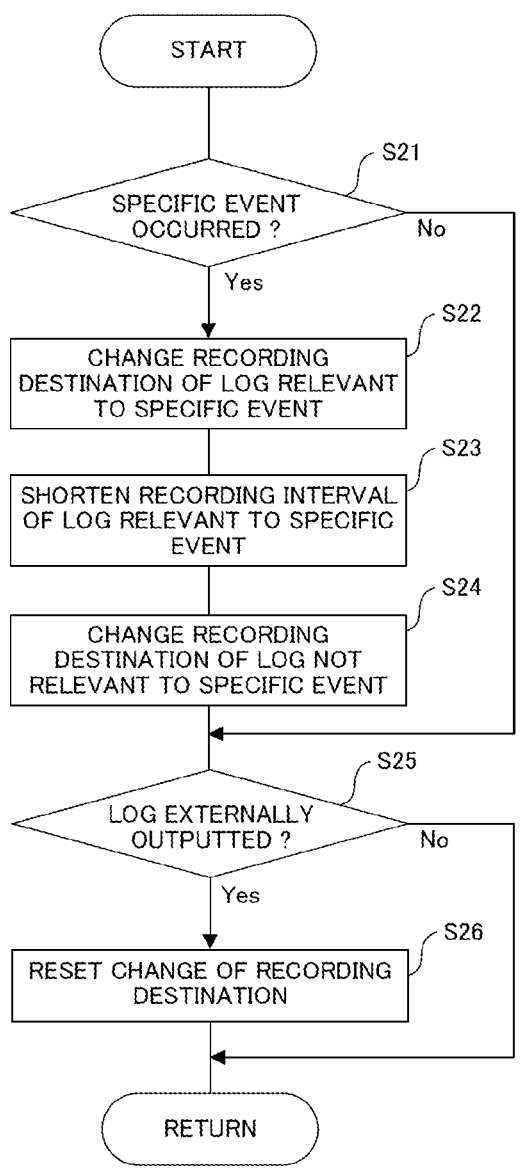
FIG. 5 is a flow chart for explaining one example of the procedure of a recording destination changing process to be executed by the multifunction peripheral according to the embodiment of the present disclosure.

Hereinafter, with reference to FIG. 5, one example of the procedure of the recording destination changing process to be executed by the CPU 51 in the multifunction peripheral 10 will be described. S21, S22, and the like in FIG. 5 represent process procedure (step) numbers to be executed by the CPU 51. It should be noted that the CPU 51 executes the log recording process shown in FIG. 4 and the recording destination changing process shown in FIG. 5 in parallel. Moreover, as another embodiment, it is conceivable that the log recording process and the recording destination changing process are executed by different processing bodies, respectively.

<Step S21>

First, in step S21, the CPU 51 determines whether a specific event set in advance has occurred. The specific event is occurrence of, for example, abnormality of fixing temperature, paper jam, toner shortage, or an unauthorized access. Here, upon determining that the specific event has occurred (Yes in S21), the CPU 51 shifts the process to step S22. On the other hand, if the specific event has not occurred (No in S21), the CPU 51 shifts the process to step S25.

<Step S22>

In step S22, the CPU 51 changes the recording destination of each of one or a plurality of logs (hereinafter, referred to as "relevant logs" that are set in advance as logs relevant to the specific event. It should be noted that the correspondence between the specific events and the relevant logs is set in advance and stored in the ROM 52 or the like. For example, for occurrence of abnormality of fixing temperature, a log of a detection result from a temperature sensor that measures the fixing temperature is set as the relevant log, and for occurrence of paper jam, logs such as the drive state of a motor for paper sheet conveyance and a detection result from the paper sheet detection sensor are set as the relevant logs.

Figure 6A:
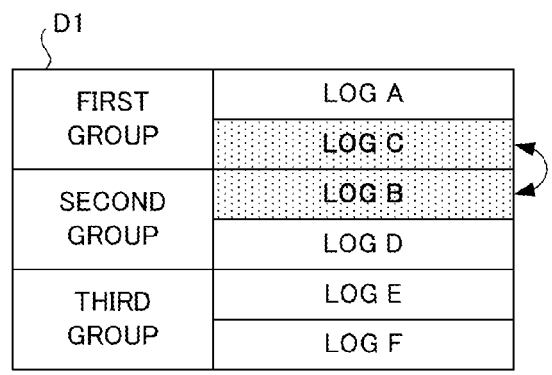
FIG. 6A and FIG. 6B are diagrams for explaining one example of logs to be respectively recorded in buffers in the multifunction peripheral according to the embodiment of the present disclosure.

More specifically, in the step S22, the CPU 51 changes the recording destination of the relevant log relevant to the specific event that has occurred, to a buffer having a storage capacity larger than that of the buffer that has been the original recording destination of the relevant log. For example, in a case where the relevant log is the log C, as shown in FIG. 6A, the CPU 51 changes the group to which the log C belongs, which is set in the log correspondence information D1, from the second group to the first group. Accordingly, in the log recording process, the log C is to be recorded in the buffer 531 corresponding to the first group (see FIG. 6B). In a case where the relevant log is the log E, the CPU 51 changes the group to which the log E belongs, which is set in the log correspondence information D1, from the third group to the first group or the second group. Accordingly, in the log recording process, the log E is to be recorded in the buffer 531 or the buffer 532 corresponding to the first group or the second group.

<Step S23>

Next, in step S23, the CPU 51 shortens the recording interval of the relevant log to a shortened interval, which is set in advance for each relevant log. For example, in a case where the recording interval of the log A before occurrence of the specific event is 0.1 second and the recording interval of the log C before occurrence of the specific event is 0.25 second, the recording interval of the log C is shortened to 0.1 second, which is the same as the recording interval of the log A. Accordingly, in the log recording process, the log C is to be recorded at a short cycle in the buffer 531 corresponding to the first group.

<Step S24>

Further, in step S24, the CPU 51 changes the recording destination of, among logs to be recorded in the buffer that becomes the recording destination of the relevant log after the change has been made in the step S22, a log not relevant to the specific event to another buffer. For example, in a case where the log B is the log not relevant to the specific event, as shown in FIG. 6A, the CPU 51 changes the group to which the log B belongs, which is set in the log correspondence information D1, from the first group to the second group.

Figure 6B:
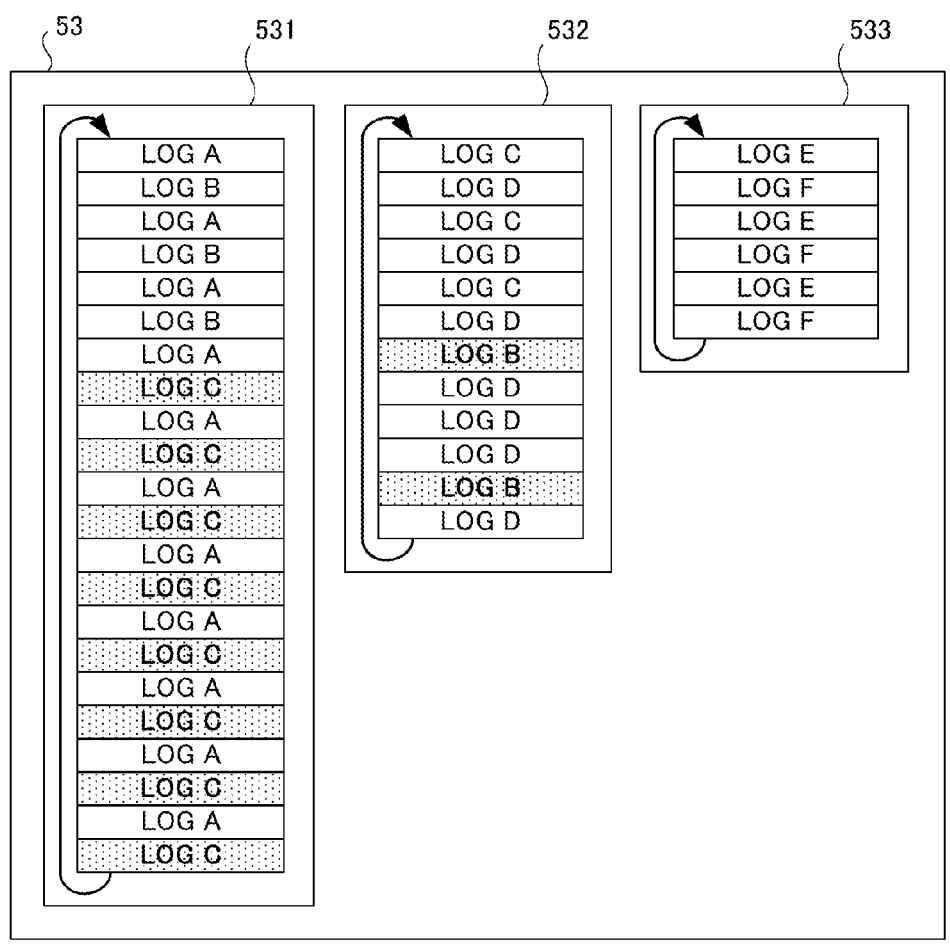

Accordingly, in the log recording process, the log B is to be recorded in the buffer 532 corresponding to the second group (see FIG. 6B). That is, the CPU 51 interchanges the buffers being the recording destinations of the log B and the log C through the step S22 and the step S24. As a result, in the buffer 531, the accumulation amount of the log C can be increased by the amount created by the log B not being recorded therein.

Further, it is conceivable that the CPU 51 changes the recording destination of the log B to the buffer 532, and prolongs the recording interval of the log B to a prolonged time set in advance. Accordingly, in the buffer 532, the accumulation amount of the log D is not reduced due to the record of the log B. In a configuration where a sufficient storage capacity of the buffer 531 is secured, it is conceivable that the CPU 51 omits the process of the step S24. That is, in this case, the log A, the log B, and the log C are to be stored in the buffer 531.

Further, it is conceivable that for each kind of the logs belonging to the first group for which the buffer 531 is set as the recording destination, a priority is set in advance. Then, it is conceivable that, in the step S24, the CPU 51 selects one or a plurality of logs in accordance with the priority, and changes the recording destination of each of the log(s) to another buffer. Further, the priority order may be different for each kind of the specific event that has been determined as having occurred in the step S21. Accordingly, a log to be recorded in precedence is changed in accordance with the content of the specific event. Furthermore, it is conceivable that, in a case where there are a plurality of the relevant logs relevant to the specific event, the CPU 51 changes all of the recording destinations of the plurality of the relevant logs to the buffer 531 in the step S22.

<Step S25>

Thereafter, in step S25, the CPU 51 determines whether the log recorded in the RAM 53 has been externally outputted. Upon determining that the log has been externally outputted (Yes in S25), the CPU 51 shifts the process to step S26. On the other hand, upon determining that the log has not been externally outputted (No in S25), the CPU 51 returns the process to the step S21.

Specifically, it is conceivable that, in a case where a USB memory has been attached to the multifunction peripheral 10 and an output request operation is performed onto the operation display portion 6 by a user, the CPU 51 outputs information of each log in the RAM 53 to the USB memory. Furthermore, it is also conceivable that, when the CPU 51 has received an output request signal from an information processing apparatus such as a personal computer connected to the multifunction peripheral 10 via a network such as a LAN or the Internet, the CPU 51 outputs the log to the information processing apparatus.

<Step S26>

It is considered that when the log in the RAM 53 has been externally outputted, the log that is necessary for clarifying the cause of the specific event has been already outputted. Therefore, in step S26, the CPU 51 resets the change, made in the recording destination changing process, of the recording destination of each of the logs. Specifically, the CPU 51 deletes the log correspondence information D1 (see FIG. 6A) after the change has been made in the step S22 or the step S24, and reads the log correspondence information D1 (see FIG. 3A) in the initial state from the ROM 52 to expand it on the RAM 53. Then, in the log recording process, the CPU 51 controls the recording destination of each log in accordance with the log correspondence information D1 in the initial state expanded on the RAM 53.

As described above, in the multifunction peripheral 10, by the recording destination changing process being executed by the CPU 51, when a specific event has occurred, the accumulation amount of the relevant log relevant to the specific event can be increased. Moreover, while no specific event has occurred, the logs are allocated to and recorded in their corresponding buffers 531 to 533 in accordance with their recording intervals. Therefore, the accumulation amounts of the respective logs having different recording intervals are individually secured.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electronic device comprising:
   a plurality of buffers in which a plurality of kinds of logs grouped into a plurality of groups based on recording intervals of the logs, are to be recorded; and
   a log recording portion configured to record each log in a buffer, among the plurality of buffers, that is assigned in accordance with a recording interval of a group to which the log belongs, wherein
   among the plurality of buffers, a buffer that is a recording destination of a log having a short recording interval has a storage capacity larger than that of a buffer that is a recording destination of a log having a long recording interval, and
   in a case where a specific event set in advance has occurred, the log recording portion changes a recording destination of each of one or a plurality of relevant logs, among the logs, that are relevant to the specific event, to another buffer having a storage capacity larger than a storage capacity of a buffer, among the plurality of buffers, that is assigned as the recording destination of the relevant log, and shortens a recording interval of the relevant log to be the same as the shortest recording interval among recording intervals of the one or the plurality of relevant logs that are to be recorded in the other buffer.

2. The electronic device according to claim 1, wherein the log recording portion changes a recording destination of, among logs to be recorded in the buffer that becomes the recording destination of the relevant log after the change, a log not relevant to the specific event to another buffer.

3. The electronic device according to claim 1, wherein the log recording portion changes a recording destination of, among logs to be recorded in the buffer that becomes the recording destination of the relevant log after the change, each of one or a plurality of logs selected in accordance with a priority set in advance to another buffer.

4. The electronic device according to claim 1, wherein when the relevant log is outputted from the buffer, the log recording portion resets the change of the recording destination of each log.

5. The electronic device according to claim 1, wherein the plurality of kinds of logs include a debug log, a paper sheet conveyance control log, a toner control log, a development control log, an emergency system log, and a system log.

6. A log recording method comprising:
   a step of preparing a plurality of buffers in which a plurality of kinds of logs grouped into a plurality of groups based on recording intervals of the logs, are to be recorded; and
   a step of recording each log in a buffer, among the plurality of buffers, that is assigned in accordance with a recording interval of a group to which the log belongs, wherein
   among the plurality of buffers, a buffer that is a recording destination of a log having a short recording interval has a storage capacity larger than that of a buffer that is a recording destination of a log having a long recording interval, and
   in a case where a specific event set in advance has occurred, a recording destination of each of one or a plurality of relevant logs, among the logs, that are relevant to the specific event, is changed to another buffer having a storage capacity larger than a storage capacity of a buffer, among the plurality of buffers, that is assigned as the recording destination of the relevant log, a recording interval of the relevant log is shortened to be the same as the shortest recording interval among recording intervals of the one or the plurality of relevant logs that are to be recorded in the other buffer.

7. The log recording method according to claim 6, wherein the plurality of kinds of logs include a debug log, a paper sheet conveyance control log, a toner control log, a development control log, an emergency system log, and a system log.

* * * * *